United States Patent
Wang

(10) Patent No.: US 6,785,969 B2
(45) Date of Patent: Sep. 7, 2004

(54) TREE PRUNER

(76) Inventor: Kuang Pin Wang, No. 425, Ta-Tun 4th Street., Taichung (TW)

(*) Notice: Subject to any disclaimer, the term of this patent is extended or adjusted under 35 U.S.C. 154(b) by 0 days.

(21) Appl. No.: 10/302,875

(22) Filed: Nov. 25, 2002

(65) Prior Publication Data

US 2004/0098866 A1 May 27, 2004

(51) Int. Cl.[7] .............................................. B26B 13/06
(52) U.S. Cl. .............................. 30/244; 30/258; 30/251
(58) Field of Search .......................... 30/250, 244, 251, 30/259, 249, 245

(56) References Cited

U.S. PATENT DOCUMENTS

| | | | | |
|---|---|---|---|---|
| 2,840,904 A | * | 7/1958 | Hutchins | 30/210 |
| 3,949,440 A | * | 4/1976 | Guerra | 7/148 |
| 5,402,576 A | * | 4/1995 | Kiyooka et al. | 30/216 |
| 5,960,546 A | * | 10/1999 | Cooke et al. | 30/249 |
| 5,970,617 A | * | 10/1999 | Chang | 30/249 |
| 5,996,232 A | * | 12/1999 | Lin | 30/250 |
| 6,038,773 A | * | 3/2000 | Le et al. | 30/249 |
| 6,446,343 B1 | * | 9/2002 | Huang | 30/249 |
| 6,526,664 B2 | * | 3/2003 | Cech | 30/249 |

* cited by examiner

*Primary Examiner*—Kenneth E. Peterson
*Assistant Examiner*—Omar Flores Sánchez
(74) *Attorney, Agent, or Firm*—Rosenberg, Klein & Lee

(57) ABSTRACT

A tree pruner includes a base member that has a connector connected to a shaft and a main plate longitudinally securely connected to the connector. A first groove is defined in the main plate and downward extends to a periphery of the main plate. A second groove is defined in the main plate and upwardly extends to the periphery of the main plate. A blade is pivotally mounted on the main plate. The blade includes a first side forming a first cutting edge corresponding to and moved within the first groove and a second side forming a second cutting edge corresponding to and moved within the second groove. A driving device is attached to the second side of the blade for reciprocally driving the blade.

2 Claims, 10 Drawing Sheets

TREE PRUNER

BACKGROUND OF THE INVENTION

1. Field of the Invention

The present invention relates to a pruner, and more particularly to a tree pruner that has two cutting edges opposite to each other.

2. Description of Related Art

A conventional tree pruner in accordance with the prior art shown in FIG. 9 comprises connector (81) and a base plate (82) longitudinally connected to the connector (81). A groove (821) is defined in the base plate (82) and downward extends to the periphery of the base plate (82). A blade (83) is pivotally mounted on the base plate (82). The blade (83) has a first side corresponding to the groove (821) and a second side opposite to the first side. A cutting edge (831) is formed on the first side of the blade (83) and a lever (84) extends from the second side of the blade (83). The cutting edge (831) is selectively moved within the groove (821). A spring (85) has two opposite ends respectively securely connected to the base plate (82) and the blade (83). A roller (88) is mounted on a lower end of the connector (81) and a pulley (87) is mounted on a free end of the lever (84). A rope (89) has one end secured on the pulley (87) and is partially coiled on the roller (88) and the pulley (87).

With reference to FIG. 10, for a convenient operation, the connector (81) is adapted to be longitudinally connected to a shaft (80) for cutting a branch (9) that has a height higher than that of the user. The base plate (82) is hung on the tree and the branch (9) is received in the groove (821) for cutting. The cutting edge (831) is moved toward the branch (9) received in the groove (821) when the lever (84) is pulled down by the rope (89).

However, there are many twigs (not shown) extending from the branch (9) so that the conventional tree pruner is tripped by the twigs. Consequently, the twigs must be cut before cutting the branch (9). Furthermore, the twigs usually are pliable so that the user is hard to hang the conventional tree pruner on the twig. Consequently, the conventional tree pruner is an inconvenient design and needs to be advantageously altered.

The present invention has arisen to mitigate and/or obviate the disadvantages of the conventional tree pruner.

SUMMARY OF THE INVENTION

The main objective of the present invention is to provide an improved tree pruner.

To achieve the objective, the tree pruner in accordance with the present invention comprises a base member that has a connector connected to a shaft and a main plate longitudinally securely connected to the connector. A first groove is defined in the main plate and downward extends to a periphery of the main plate. A second groove is defined in the main plate and upwardly extends to the periphery of the main plate. A blade is pivotally mounted on the main plate. The blade includes a first side forming a first cutting edge corresponding to and moved within the first groove and a second side forming a second cutting edge corresponding to and moved within the second groove. A driving device is attached to the second side of the blade for reciprocally driving the blade.

Further benefits and advantages of the present invention will become apparent after a careful reading of the detailed description with appropriate reference to the accompanying drawings.

DETAILED DESCRIPTION OF THE INVENTION

Figure 1:
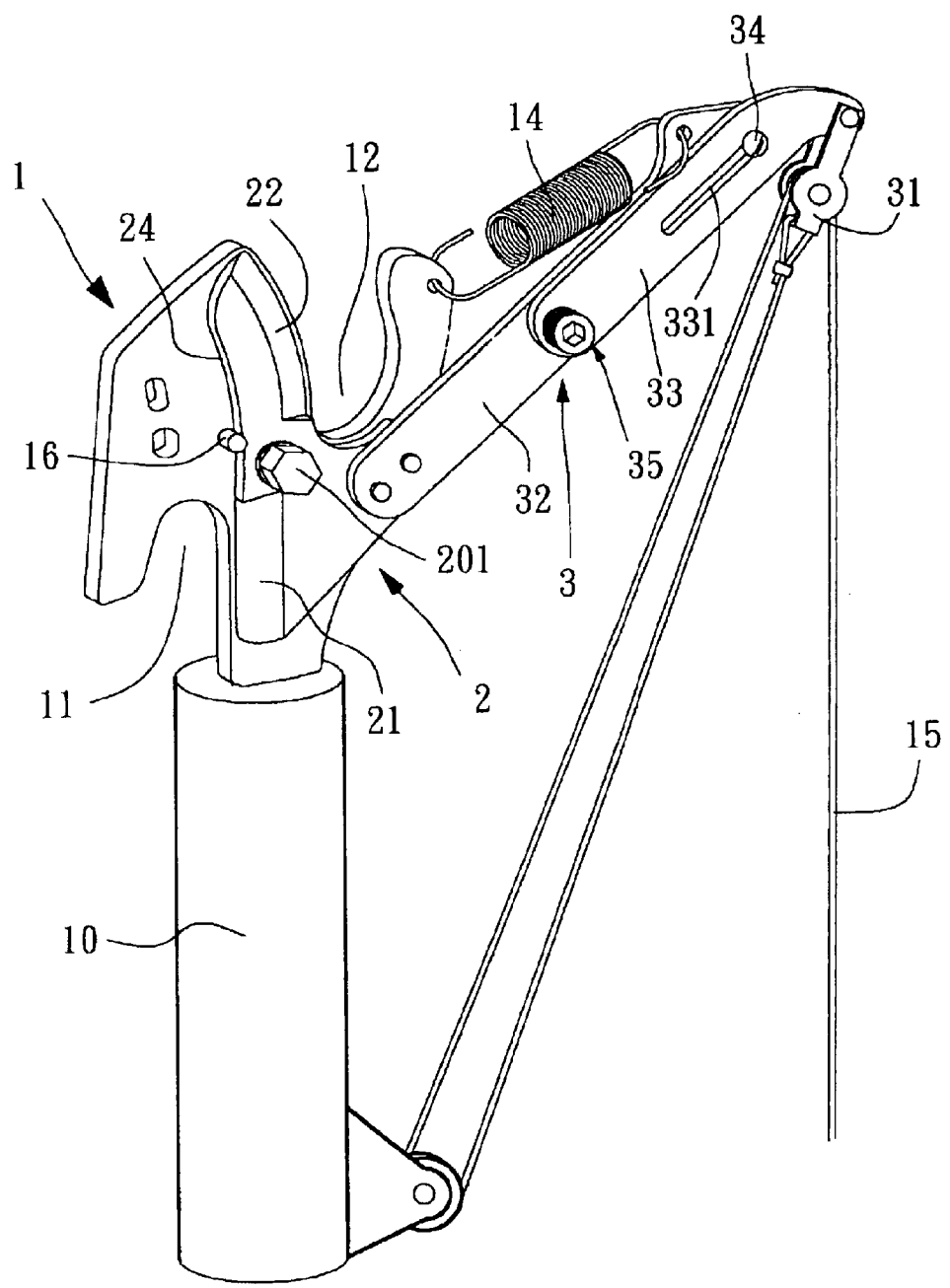
FIG. 1 is a perspective view of a tree pruner in accordance with the present invention.
Figure 2:
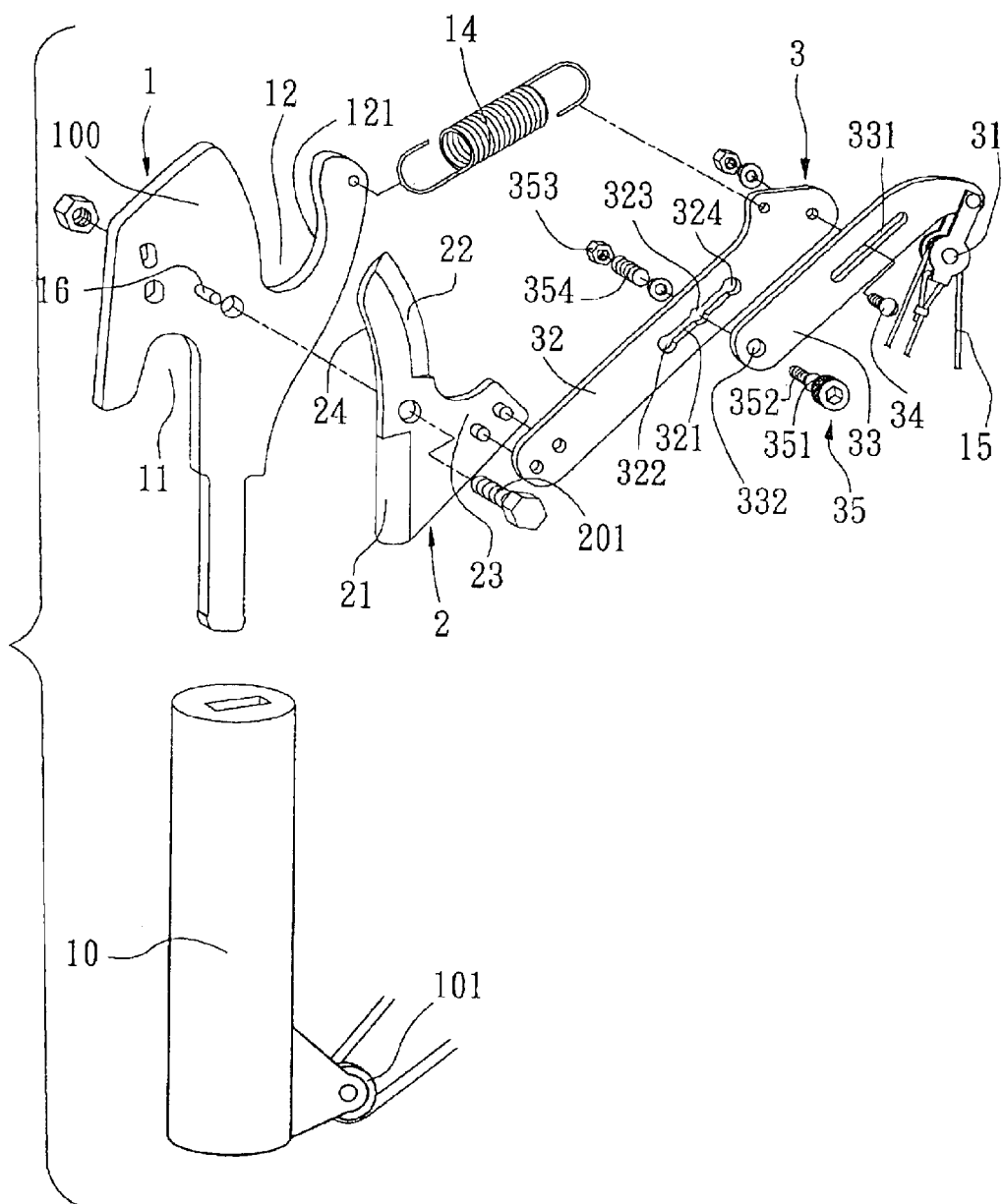
FIG. 2 is an exploded perspective view of the tree pruner in FIG. 1.
Figure 3A:
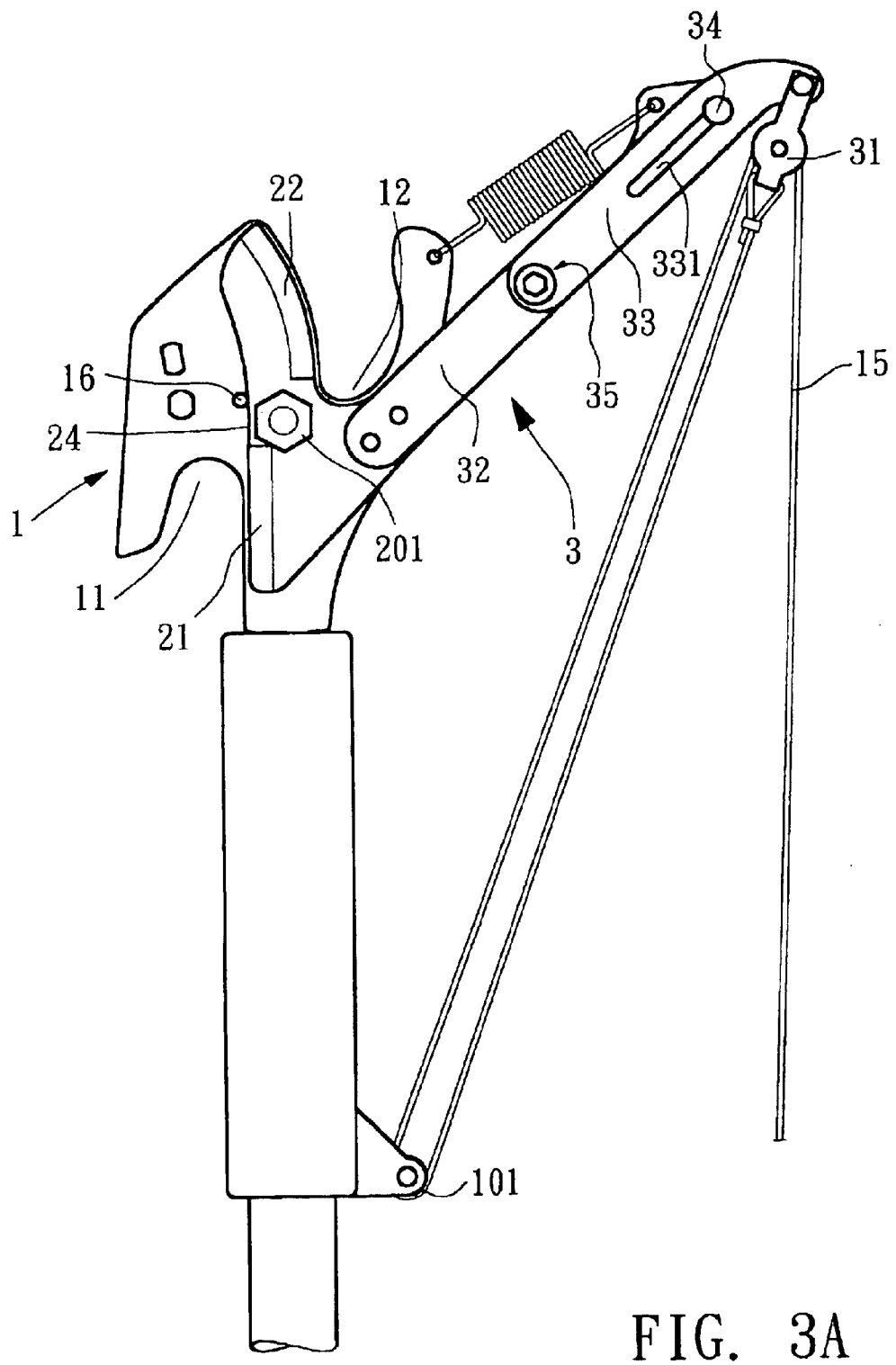
FIG. 3A is a side plan view of the tree pruner in FIG. 1 showing that the blade is in an original position.
Figure 3B:
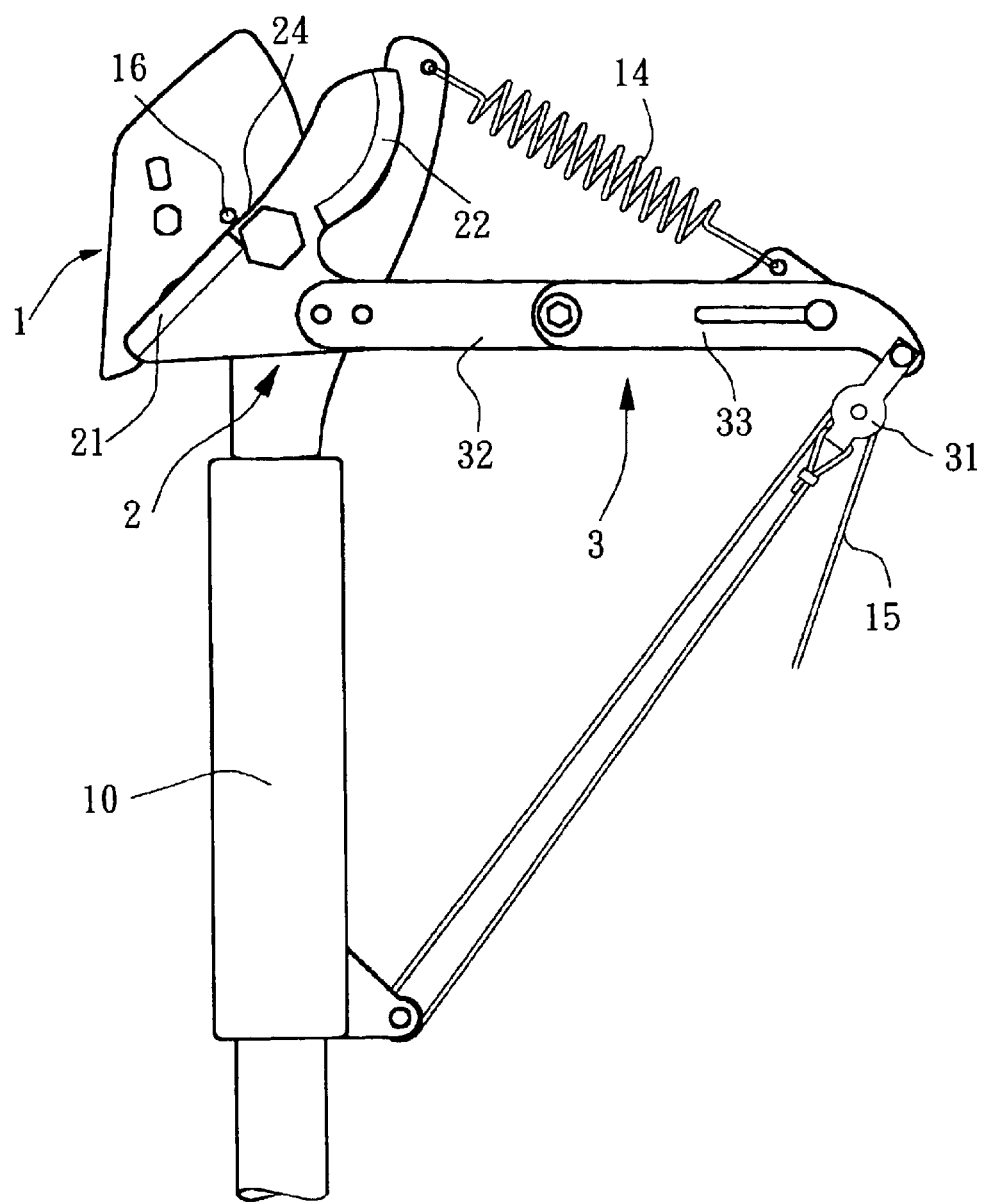
FIG. 3B is a side plan view of the tree pruner in FIG. 1 showing that the blade in a position after cutting.

Referring to the drawings and initially to FIGS. 1–3B and 6, a tree pruner in accordance with the present invention comprises a base member (1), a blade (2) pivotally mounted on the base member (1) and a drive device (3) secured on the blade (2) for reciprocally driving the blade (2).

The base member (1) includes a connector (10) adapted to be longitudinally connected to a shaft (4) and a main plate (100) longitudinally securely connected to the connector (10). A roller (101) is rotatably mounted on a lower end of the connector (10). The main plate (100) includes a first groove (11) defined in the main plate (100) and downward extending to a periphery of the main plate (100), and a second groove (12) defined in the main plate (100) and upwardly extending to the periphery of the main plate (100). A concave portion (121) is defined in one side of the second groove (12) opposite to the first groove (11). A stopper (16) extends from one side of the main plate (100).

The blade (2) is pivotally mounted on the main plate (100) and abuts the stopper (16). A pivot pin (201) extends through the blade (2) in a middle portion of the blade (2) and the main plate (100) to prevent the blade (2) from detaching from the main plate (11). The blade (2) includes a first side forming first cutting edge (21) corresponding to the first groove (11) and a second side forming second cutting edge (22) corresponding to the second groove (12). The first cutting edge (21) is moved within the first groove (11) and the second cutting edge (22) is moved within the second groove (12). The blade (2) includes a protrusion (23) integrally extending from the second side of the blade (2) opposite to the first cutting edge (21).

Figure 4:
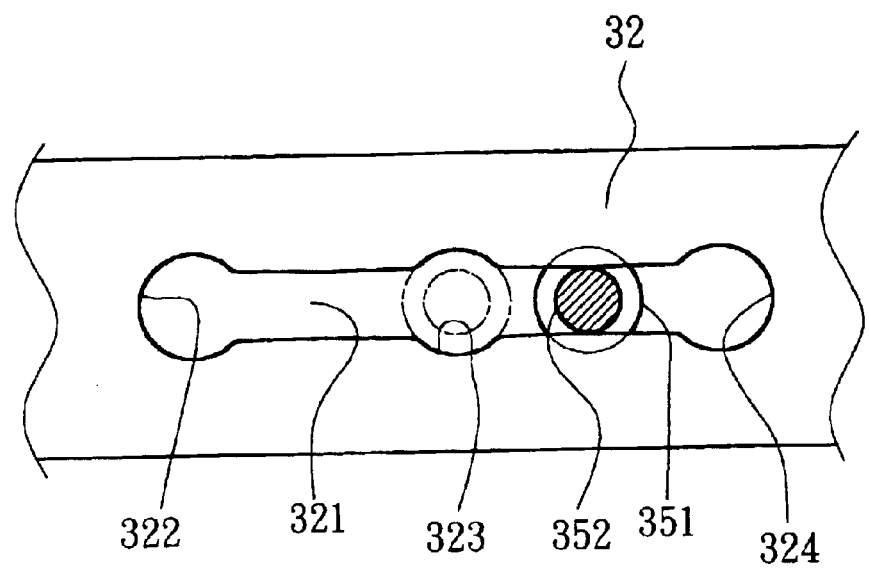
FIG. 4 is a partial side plan view of the lever of the tree pruner in FIG. 1.

The drive device (3) includes a lever (32) having a first end secured on the protrusion (23). Further with reference to FIG. 4, the lever (32) includes a first slot (321) longitudinally defined in the lever (32), a first hole (322) defined to communicate with a first end of the first slot (321), a second hole (323) defined to communicate with a middle portion of the first slot (321) and a third hole (324) defined communicate with a second end of the first slot (321). The first hole (322), the second hole (323) and the third hole (324) each has a diameter greater than a width of the first slot (321) and equal to one another. A spring (14) is mounted between the lever (32) and the main plate (100). The spring (14) has two opposite ends respectively connected to the main plate (100) and a second end of the lever (32). An auxiliary rod (33) is slidably mounted on the lever (32). The auxiliary rod (33) has a second slot (331) longitudinally defined therein and a bore (332) defined near a first end of the auxiliary rod (33) and communicating with the first slot (321). The bore (332) has a diameter being equal to that of the first hole (322), the second hole (323) and the third hole (324) in the lever (32). A bolt (34) is partially received in the second slot (331) and secured on the lever (32). The auxiliary rod (33) can longitudinally extend relative to the lever (32). A fastener (35) extends through and fixed on the auxiliary rod (33) and the lever (32). The bolt (34) and the fastener (35) can hold auxiliary rod (34) in place on the lever (32) and prevent the auxiliary rod (34) from rotating relative to the lever (32). Further with reference to FIG. 5, the fastener (35) includes an enlarged head (350), a pivot section (351) longitudinally extending from the enlarged head (350), a rod (352) centrally and longitudinally extending from the pivot section (351) and a locking member (353) is secured on a free end of the rod (352) to prevent the fastener (35) from detaching from the lever (32) and the auxiliary rod (33). The rod (352) has a diameter smaller than that of the pivot section (351). In the preference embodiment of the present invention, the rod (352) is threaded and the locking member (353) is a bolt. The enlarged head (350) has a diameter greater than that of the bore (332). The pivot section (351) is movably received in the bore (332) and selectively received in the first hole (322), the second hole (323) or the third hole (324). A spring (354) is compressively mounted around the rod (352). The spring (354) has a first end abutting the lever (32) and a second end abutting the locking member (353) to provide a restitution force to the fastener (35). A pulley (31) is mounted to a second end of he auxiliary (33). A rope (15) has a first end secured on the pulley (31) and is coiled the roller and the pulley (31), and a second end provided to be hold by the user to drive the lever (32).

Figure 6:
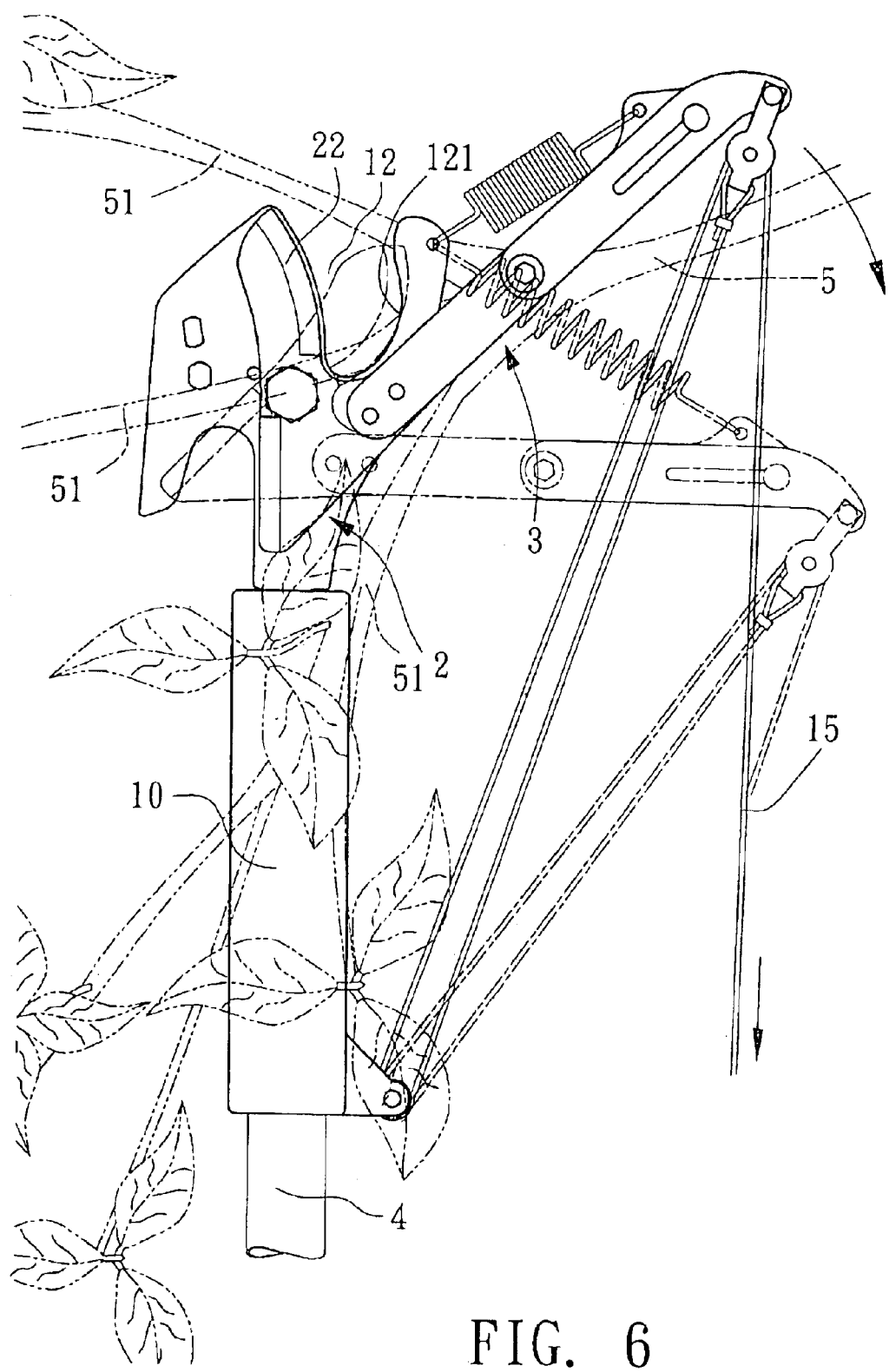
FIG. 6 is an operational view of the tree pruner in FIG. 1 showing that the tree pruner cutting a twig.

With reference to FIG. 6, the present invention is provided to cut a twig (51). The lever (32) is downward pulled when the user downward pulls the rope (15) after the twig (51) being received in the second groove (12) in the base plate (100). The twig (51) never escapes from the second groove (12) during cutting because the concave portion (121) of the second groove (12) and the convex second cutting edge (22) clamp the twig (51) during cutting.

Figure 5:
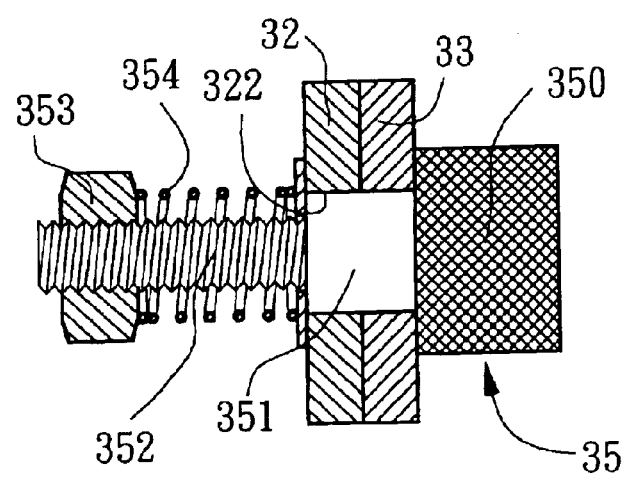
FIG. 5 is a cross-sectional plan view of the fastener of the drive device of the tree pruner in FIG. 1.
Figure 7:
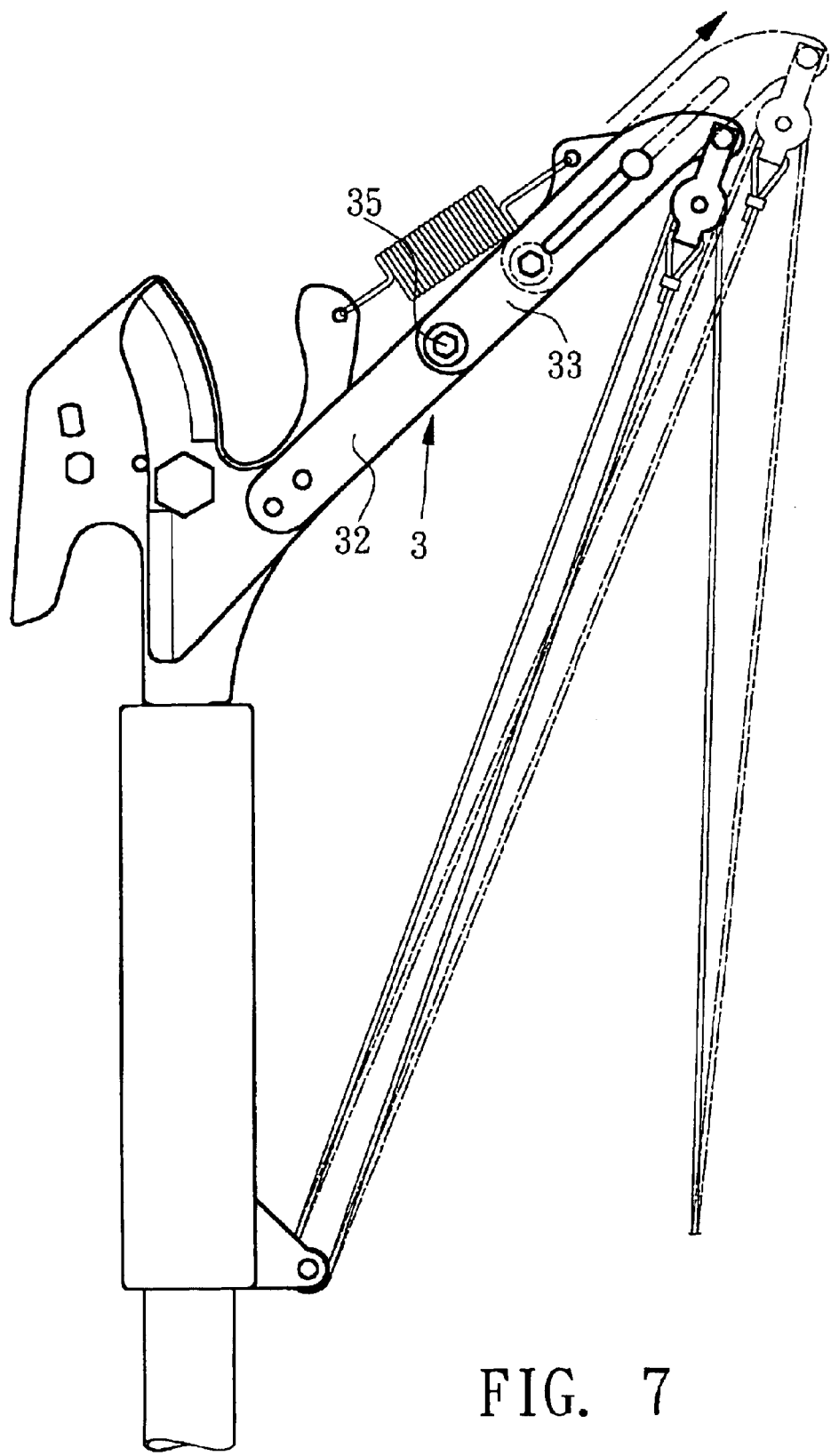
FIG. 7 is an operational view of the tree pruner in FIG. 1 showing that the auxiliary rod extends relative to the lever.
Figure 8:
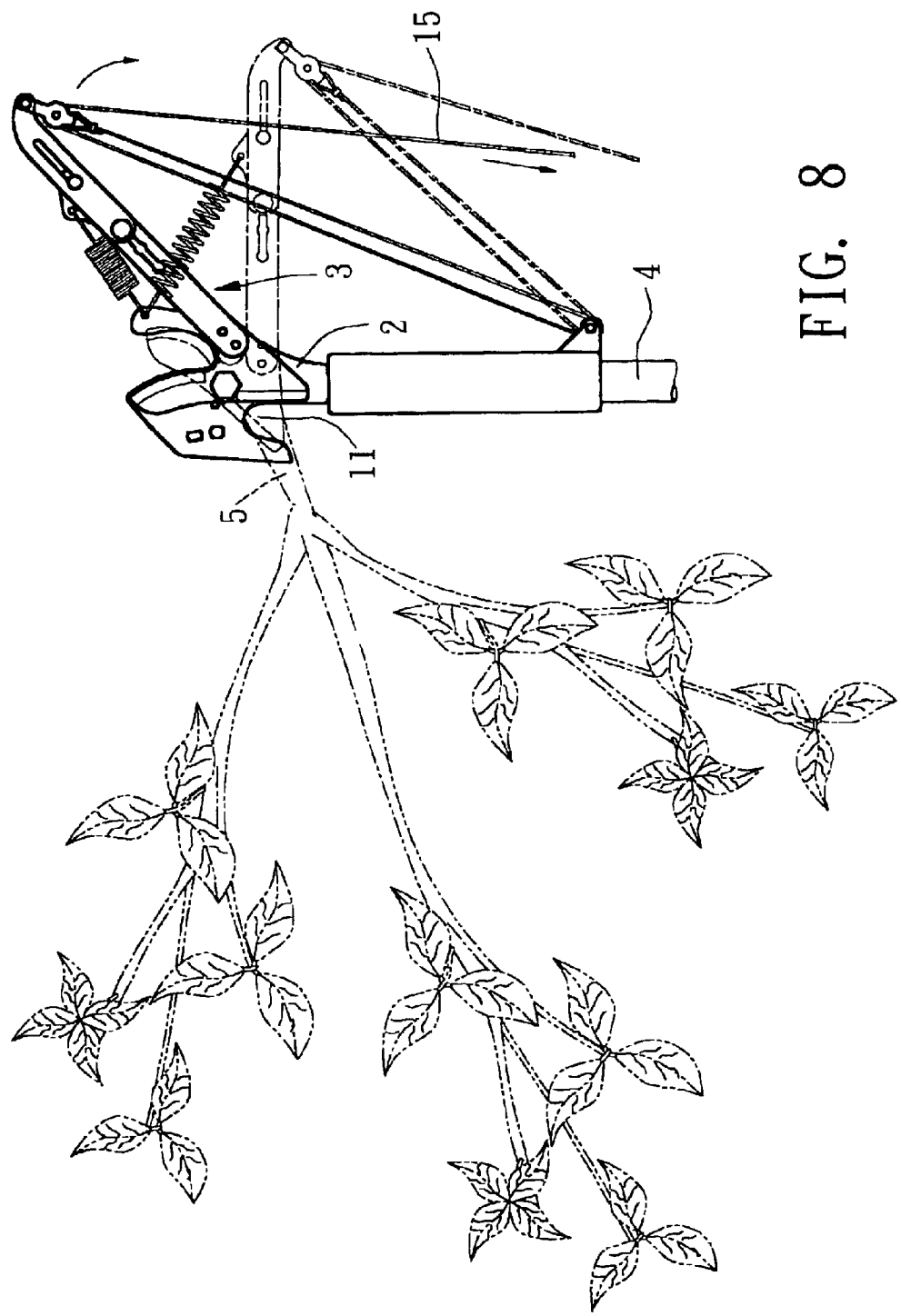
FIG. 8 is an operational view of the tree pruner in FIG. 1 showing that the tree pruner cutting a branch.
Figure 9:
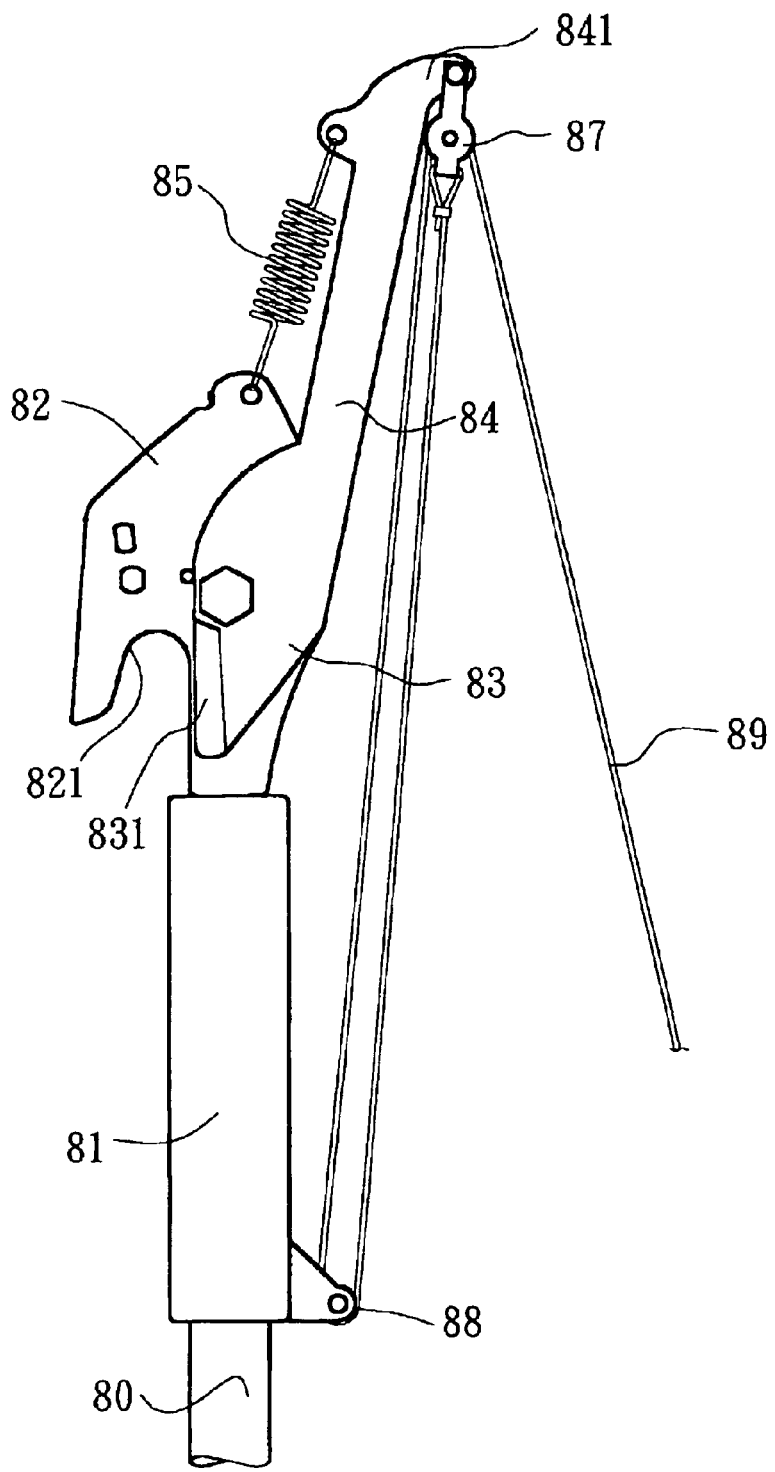
FIG. 9 is a side plan view of a tree pruner in accordance with the prior art.
Figure 10:
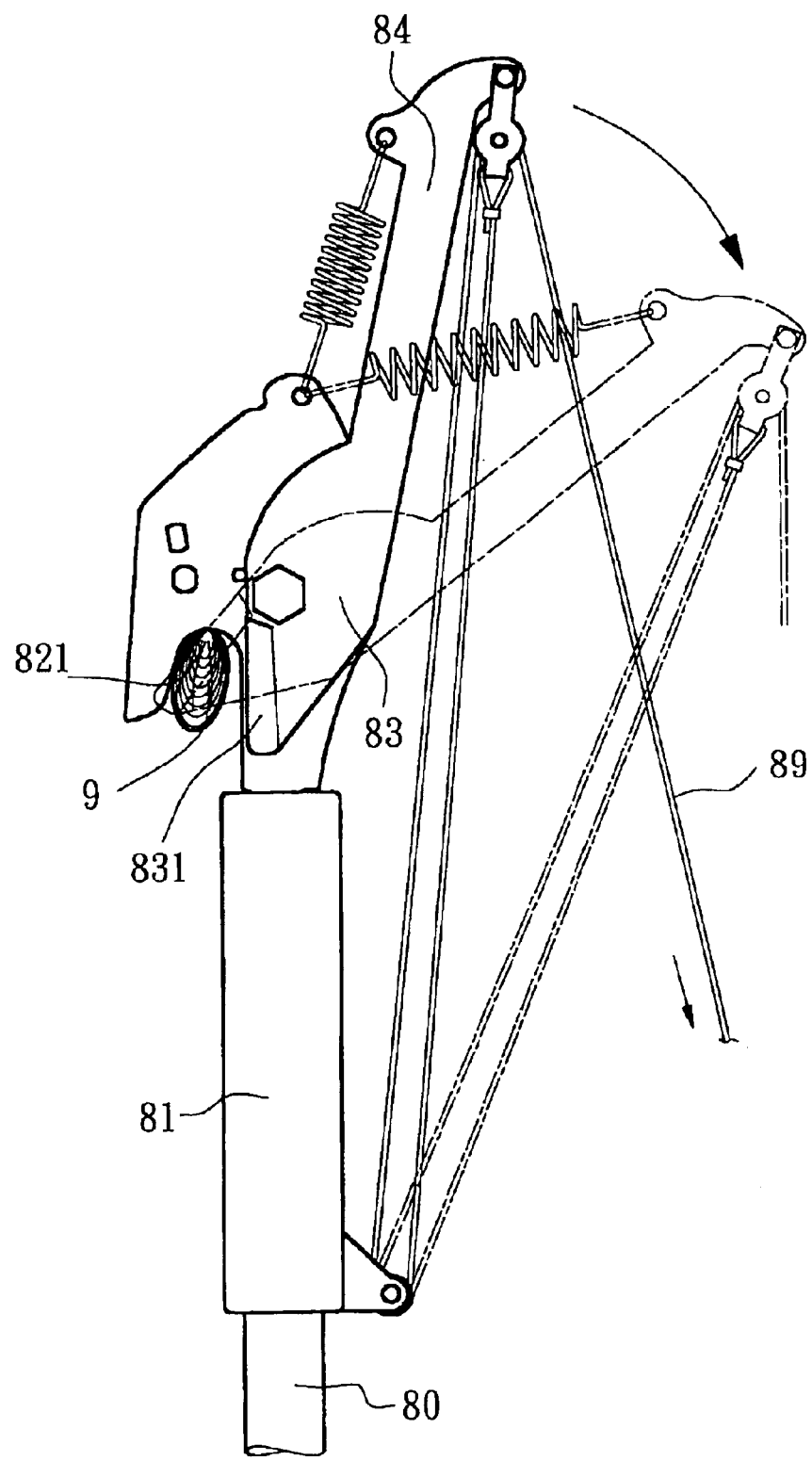
FIG. 10 is an operational view of the conventional tree pruner in FIG. 9.

With reference to FIGS. 5, 7 and 8, the first groove (11) and the first cutting edge (21) are provided to cut a branch (5). Then the moment of the drive device (3) needs to be elongated because the branch (5) has a diameter than that of the twig (51). To elongate the moment of the drive device (3), the rod (352) is pushed to make the locking member compressing the spring (354). Consequently, the auxiliary rod (33) can outwardly extend relative to the lever (32) when the pivot section (351) is removed from the first hole (322) and the bore (332), and the rod (352) is received in the first hole (322) and the bore (332) and aligns with the first slot (321) in the lever (32) because the rod (352) has a diameter smaller than the width of the first slot (321). The rod (352) is set free and the pivot section (351) is received in the second hole (323)/the third hole (324) when the auxiliary rod (33) extends to a suitable length such that the moment of the drive device is elongated and the user can cut off the branch (5) more labor-saving.

Although the invention has been explained in relation to its preferred embodiment, it is to be understood that many other possible modifications and variations can be made without departing from the spirit and scope of the invention as hereinafter claimed.

What is claimed is:

1. A tree pruner comprising:
   a base member including:
      a connector adapted to be connected to a shaft;
      a main plate longitudinally securely connected to the connector;
      a first groove defined in the main plate and downward extending to an periphery of the main plate;
      a second groove defined in the main plate and upwardly extending to the periphery of the main plate; and
   a roller rotatably mounted on lower end of the connector;
   a blade pivotally mounted on the main plate and including:
      a first side forming a first cutting edge corresponding to and moved within the first groove in the main plate;
      a second side forming a second cutting edge corresponding to and moved within the second groove in the main plate; and
      a protrusion extending from the second side of the blade; and
   a driving device attached to the protrusion of the blade for reciprocally driving the blade and including:
      a pulley mounted to a distal end opposite to the blade;
      a rope having a first end secured on the pulley and being coiled the roller and the pulley and a second end adapted to be hold by a user to drive the driving device;
      a spring mounted between the driving device and the main plate to provide a restitution force to the driving device, the spring having two opposite ends respectively securely connected to the driving device and the main plate; and
      a lever attached to the second side of the blade and an auxiliary rod slidably mounted on the lever, the auxiliary rod selectively longitudinally extending relative to the lever to elongate a moment of the driving device.

2. The tree pruner as claimed in claim 1, wherein:
   the lever comprises:
      a first slot longitudinally defined in the lever;
      a first hole defined in the lever and communicating with a first end of the first slot;
      a second hole defined in the lever and communicating with a middle portion of he first slot; and
      a third hole defined in the lever and communicating with a second end of the first slot, the first hole, the second hole and the third hole each having a diameter greater than a width of the first slot and equal to one another;
   the auxiliary rod comprises:
      a second slot longitudinally defined in the auxiliary rod;
      a bore defined in the auxiliary rod and extending to communicating with the first slot in the lever, the bore having a diameter being equal to that of the first hole, the second and the third hole in the lever; and
      a bolt partially received in the second slot and secured on the lever; and
   the driving device further comprises a fastener extending through and fixed on the auxiliary rod and the lever such that the bolt and the fastener can prevent the auxiliary rod from rotating relative to the lever, the fastener including:

an enlarged head having a diameter greater than that of the bore in the auxiliary rod;
a pivot section longitudinally extending from the enlarged head, the pivot section movably received in the bore and selectively received in a corresponding one of the first hole, the second hole and the third hole;
a rod centrally and longitudinally extending from the pivot section, the rod having a diameter smaller than that of the pivot section and the width of the first slot;
a locking member secured to a free end of the rod to prevent the fastener from detaching from the lever and the auxiliary rod; and
a spring compressively mounted the rod between the lever and the locking member to provide a restitution force to the fastener.

* * * * *